United States Patent
Romenesko et al.

[11] Patent Number: 5,916,952
[45] Date of Patent: *Jun. 29, 1999

[54] POLY(PHENYLENE ETHER) RESIN MODIFIED WITH SILICONE RUBBER POWDER

[75] Inventors: David Joseph Romenesko, Midland; Steven Patrick Mullan, Sanford, both of Mich.

[73] Assignee: Dow Corning Corporation, Midland, Mich.

[ * ] Notice: This patent is subject to a terminal disclaimer.

[21] Appl. No.: 08/975,031

[22] Filed: Nov. 20, 1997

Related U.S. Application Data

[63] Continuation of application No. 07/793,877, Nov. 18, 1991, abandoned.

[51] Int. Cl.$^6$ ........................................................ C08K 3/00
[52] U.S. Cl. ............................................ 524/493; 524/492
[58] Field of Search ...................................... 524/492, 493

[56] References Cited

U.S. PATENT DOCUMENTS

| | | | |
|---|---|---|---|
| 3,365,517 | 1/1968 | Barth | 260/860 |
| 3,423,479 | 1/1969 | Hendricks | 260/824 |
| 3,737,479 | 6/1973 | Haaf . | |
| 3,824,208 | 7/1974 | Link et al. . | |
| 3,920,770 | 11/1975 | Nakashio | 260/897 R |
| 4,226,761 | 10/1980 | Cooper et al. | 260/42.18 |
| 4,365,042 | 12/1982 | Cooper et al. | 525/68 |
| 4,500,659 | 2/1985 | Kroupa et al. . | |
| 4,548,979 | 10/1985 | Weise | 524/403 |
| 4,663,397 | 5/1987 | Morita | 525/398 |
| 4,742,142 | 5/1988 | Shimizu et al. | 524/862 |
| 4,761,454 | 8/1988 | Oba | 524/862 |
| 4,778,860 | 10/1988 | Morita | 525/431 |
| 4,880,882 | 11/1989 | Morita | 525/446 |
| 4,888,390 | 12/1989 | Liang et al. | 525/189 |
| 4,891,393 | 1/1990 | Hirai et al. | 523/216 |
| 4,898,989 | 2/1990 | Fitzgerald | 523/351 |
| 5,028,653 | 7/1991 | Desmanceau et al. | 524/588 |
| 5,082,596 | 1/1992 | Fukuda et al. | 524/588 |
| 5,153,238 | 10/1992 | Bilgrien et al. . | |
| 5,218,014 | 6/1993 | Matsumoto | 523/209 |

FOREIGN PATENT DOCUMENTS

| | | | |
|---|---|---|---|
| 1195027 | 10/1985 | Canada | 525/393 |
| 0369199 | 10/1989 | European Pat. Off. . | |
| 63/255382 | 10/1988 | Japan . | |

OTHER PUBLICATIONS

Huang, Weiyu, and Harry L. Frisch. Poly(2,6–dimethyl–1,4–phenylene oxide)/poly(dimethylsiloxane) system—Architecture and selected properties. Makromol. Chem., supp. 15, 137–145(1989),

*Primary Examiner*—Edward J. Cain
*Attorney, Agent, or Firm*—Alex Weitz

[57] ABSTRACT

A free-flowing silicone rubber powder, having an average particle size of 1 to 1000 microns and prepared by mixing a polydiorganosiloxane with a silica filler, is uniformly dispersed in a poly(phenylene ether) resin using conventional equipment, such as a single screw or, preferably, a twin screw extruder. When employed at relatively low concentrations, such as about 0.2 to 3 parts by weight of powder per 100 parts by weight of resin, a significant improvement in the processability is obtained, while modification at higher levels, such as 5 to 20 parts by weight of powder per 100 parts by weight of the resin results in a resin composition having greatly augmented impact resistance.

17 Claims, No Drawings

POLY(PHENYLENE ETHER) RESIN MODIFIED WITH SILICONE RUBBER POWDER

This application is a continuation of application Ser. No. 07/793,877 filed Nov. 18, 1991 which application is now abandoned.

FIELD OF THE INVENTION

The present invention relates to poly(phenylene ether) resin compositions. More particularly, the invention relates to poly(phenylene ether) resins which are modified with a silicone rubber powder.

BACKGROUND OF THE INVENTION

Poly(phenylene ether) resins (PPE), and particularly the commercially successful engineering plastics based on poly (2,6-dimethyl-1,4-phenylene ether), have been developed over the last thirty years. Despite its excellent physical property characteristics, however, the latter thermoplastic material can not be processed in a conventional manner (e.g., in injection molding operations) due to its high melting viscosity. This disadvantage has been offset to some extend by the discovery that this resin can be blended with polystyrene to form a thermodynamically stable plastic alloy, a rare phenomenon since such polymeric components are generally mutually incompatible. Such alloys of poly(2,6-dimethyl-1,4-phenylene ether) resin with polystyrene (PS), or high impact polystyrene (HIPS), can be readily processed but require the addition of at least about 20 weight percent of the PS or HIPS component to accomplish this end, an additional benefit from such modification being improved impact resistance when HIPS is used.

There is, however, a downside to this modification, since certain physical properties of HIPS, such as heat distortion temperature, are significantly inferior relative to the virgin PPE resin. Attempts to resolve some of these difficulties, as well as to provide poly(phenylene ether) systems having improved mechanical properties, have focused on modification with various rubber components which are dispersed in the poly(phenylene ether) resin.

For example, U.S. Pat. No. 5,365,042 to Cooper et al. describes blends of poly(phenylene ether) resins with silicone-grafted EPDM rubber. The resulting compositions exhibit improved ductility and impact strength. Likewise, in U.S. Pat. No. 4,226,761, Cooper et al. disclose a composition comprising a poly(phenylene ether) resin and an alkenyl aromatic resin, such as polystyrene, the latter being modified with a polysiloxane in the form of small rubber-like particles by polymerizing alkenyl aromatic monomer in the presence of the polysiloxane.

European Patent Application 0 369 199 A2 to General Electric Co. teaches thermoplastic molding compositions comprising a poly(phenylene ether) resin which is modified with a multi-stage polyorganosiloxane/vinyl-based graft polymer. These materials are stated to have improved impact resistance, flame resistance and moldability.

In an article published in Makromol. Chem., Suppl. 15, 137–145 (1989), Huang et al. studied the physical and morphological properties of various polyblends of poly(2, 6-dimethyl-1,4-phenylene ether) and polydimethylsiloxane in which the former resin was crosslinked in solution to different extents using an amine compound. The siloxanes investigated had relatively low molecular weights (below about 2000) and were capable of forming interpenetrating polymer networks with the poly(phenylene ether) resin in certain instances.

Additionally, organosiloxane compositions in the form of a free-flowing powder prepared from a high consistency "gum-type" polydiorganosiloxane and a reinforcing filler are described in a number of publications, although there is no suggestion to combine these with a given thermoplastic resin, particularly a poly(phenylene ether).

In accordance with the teaching of Link and Scarbel in U.S. Pat. No. 3,824,208, a powdered material is obtained by first reducing the particle size of the polydiorganosiloxane and then mixing the particles with at least 15 parts by weight of a reinforcing filler at a temperature of from 0 to 100° C. and under particular shear conditions.

Japanese Patent Publication No. 2/102007, published on Apr. 13, 1990, teaches pelletizing a high consistency or "gel" type vinyl-containing polydiorganosiloxane and then blending the resultant pellets with a filler. A processing aid is included to prevent a phenomenon referred to as "creping" or "crepe hardening". The resultant composition is then mixed using a high speed rotating blade at 10 to 100° C. to produce a free-flowing powder.

Elastomers prepared from silicone rubber powders according to the above cited teachings of Link and Scarbel and Japanese Patent Publication No. 2/102007 were found to have a number of shortcomings, such as the presence of undesirable gel particles which are discernable to the unaided eye as clear spots when the powdered rubber is combined with a suitable dye and massed into a thin section. This gel problem was essentially overcome by the discoveries of Bilgren et al., as disclosed in a copending application for patent entitled "Storage Stable Organosiloxane Composition and Method for Preparing Same," Ser. No. 790,043, filed on Nov. 12, 1991, now U.S. Pat. No. 5,513, 238 assigned to the assignee of the present invention and hereby incorporated by reference. The silicone rubber powder compositions of Mullan et al. have an average particle size of 1 to 1000 microns and are prepared by blending a high consistency polydiorganosiloxane into a quantity of fluidized reinforcing filler that is heated to a temperature of >100° C. to 200° C. prior to, or immediately following, introduction of the polydiorganosiloxane. The resultant rubber powders additionally exhibit excellent storage stability and can be subsequently massed and cured to yield substantially gel-free elastomers having excellent physical properties.

The addition of various rubber compositions, including silicones, to other thermoplastic resin systems has also been investigated. Liang et al., in U.S. Pat. No. 4,888,390, showed that certain rubbers could be used to improve the crack and/or impact resistance of a poly(phenylene sulfide) resin, but there is no suggestion in this patent that a powdered rubber component should be employed.

SUMMARY OF THE INVENTION

It has now bee discovered that certain silicone rubber powders, preferably produced according to the methods disclosed by Bilgrien et al., cited supra, can be used as a highly effective modifier for poly(phenylene ether) resins and for poly(2,6-dimethyl-1,4-phenylene ether) resin in particular. When used at relatively low concentrations, such as about 0.2 to 3 parts by weight per 100 parts by weight of resin, the silicone rubber powder imparts greatly improved flow characteristics to the poly(phenylene ether) resin and thus allows it to be readily processed at lower temperatures in conventional equipment, such as an extruder. Such facile processing is not possible in the case of the virgin resin, which degrades at temperatures sufficient to induce the required fluidity. Additionally, the modified resins exhibit improved impact resistance over the virgin poly(phenylene ether), particularly when the silicone rubber powder content is increased to about 5 to 20 parts by weight per 100 parts by weight of the resin. In this regard, it has been surprisingly noted that particular composition, wherein silica filler is treated with an oligomeric hydroxy-terminated polydimethylsiloxane, show an exceptionally improved impact resistance. Moreover, the rubber powders of the present invention are readily dispersible in the poly (phenylene ether) resins using conventional process equipment, such as a single screw or, preferably, a twin screw extruder. This offers a significant advantage to a plastics manufacturer since both resin and modifying rubber ingredients can be handled as free-flowing solid feeds and are therefore amenable to facile introduction to mixing equipment (e.g., from a hopper).

The present invention therefore relates to a composition consisting essentially of a homogeneous blend of (A) 100 parts by weight of a poly(phenylene ether) thermoplastic; and (B) from 0.2 to 50 parts by weight of a silicone rubber powder having a uniformly dispersed in said poly (phenylene ether) thermoplastic, said silicone rubber powder having an average particle size of 1 to 1000 microns and consisting essentially of (i) 100 parts by weight of a polydiorganosiloxane gum which contains at least one functional group selected from the group consisting of hydroxyl and vinyl, and (ii) from 10 to 80 parts by weight of a silica filler.

DETAILED DESCRIPTION OF THE INVENTION

The poly(phenylene ether) resin (A) of the present invention is well known in the art and is a homopolymer or copolymer of phenol monomers. These monomers may be unsubstituted or have organic substituents, such as alkyl radical, haloalkyl radicals, halogen groups, aryl groups and hydroxyalkyl groups, attached to the aromatic rings thereof. The types of poly(phenylene ether) resins contemplated herein are detailed in U.S. Pat. No. 4,940,753 to Okada et al., the disclosure of which at column 2, line 19 through column 3, line 25 is hereby incorporated by reference. Although a large variety of such resins is known, it is only the polymer based on poly(2,6-dimethyl-1,4-phenylene ether) which is commercially important and is the preferred embodiment of this component of the invention.

Component (B) of the present invention is a silicone rubber powder which consists essentially of 100 parts by weight of one or more high consistency polydiorganosiloxanes (i) blended with about 10 to about 80 parts by weight of treated silica filler (ii).

The polydiorganosiloxane (i) used in the preparation of silicone rubber powder (B) is a high consistency polymer or copolymer having the consistency of a gum and containing at least one functional group, selected from the group consisting of hydroxyl and vinyl, in its molecule. The molecular weight of this polymer is sufficient to impart a viscosity of from about 1,000,000 to about 100,000,000 centipoise to the polymer at 25° C. An alternate characterization of the viscosity of the polydiorganosiloxane is the "Williams plasticity number," as determined by the American Society of Testing or Materials (ASTM) test method 926. The plasticity number, as used herein, is defined as the thickness in millimeters×100 of a cylindrical test specimen 2 cm$^3$ in volume and approximately 10 mm in height after the specimen has been subjected to a compressive load of 49 Newtons for three minutes at 25° C. The high consistency type of polydiorganosiloxanes contemplated herein typically exhibit a Williams plasticity of about 150 to about 500.

The organic groups of the polydiorganosiloxane (i) are independently selected from hydrocarbon or halogenated hydrocarbon radicals such as alkyl and substituted alkyl radicals containing from 1 to 20 carbon atoms; alkenyl radicals, such as vinyl and 5-hexenyl; cycloalkyl radicals, such as cyclohexyl; and aromatic hydrocarbon radicals, such as phenyl, benzyl and tolyl. Preferred organic groups are lower alkyl radicals containing from 1 to 4 carbon atoms, phenyl, and halogen-substituted alkyl such as 3,3,3-trifluoropropyl. Thus, the polydiorganosiloxane can be a homopolymer, a copolymer or a terpolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. Most preferably, component (i) is a polydimethylsiloxane which is terminated with a vinyl group at each end of its molecule and/or contains at least one vinyl group along its main chain.

Methods for preparing high consistency (or "gum" type) polydiorganosiloxanes are sufficiently well known that they do not require a detailed discussion in this specification. For example, a typical method for preparing these polymers comprises the acid- or base-catalyzed polymerization of cyclic diorganosiloxanes.

Component (ii) of the silicone rubber powder (B) is a finely divided filler derived from fume or precipitated forms of silica or silica aerogel. These well known fillers are typically characterized by surface areas greater than about 50 m$^2$/gram. The fume form of silica is a preferred reinforcing filler based on its availability, cost and high surface area, which can be as high as 900 m$^2$/gram, but preferably has a surface area of 50 to 400 m$^2$/gram.

For the purpose of the present invention, the silica filler is preferably treated by reaction with a liquid organosilicon compound containing silanol groups or hydrolyzable precursors of silanol groups. Compounds that can be used as filler treating agents, also referred to as anti-creping agents, include such components as low molecular weight liquid hydroxy- or alkoxy-terminated polydiorganosiloxanes, hexaorganodisiloxanes and hexaorganodisilazanes. The silicon-bonded hydrocarbon radicals in all or a portion of the filler treating agent can contain substituents such as carbon—carbon double bonds. It is preferred that the treating compound is an oligomeric hydroxy-terminated polydimethylsiloxane having an average degree of polymerization (DP) of 2 to about 100. A highly preferred treating fluid of this type has a DP of about 2 to about 10.

The silica filler used in the present method is preferably reacted with about 10 to about 45 weight percent, based on filler weight, of the filler treating agent prior to being blended with the polydiorganosiloxane to form the silicone rubber powder (B). Treatment of the filler can be carried out in the same mixing vessel used to prepare the silicone rubber powder. The silica or other reinforcing filler is typically maintained at a temperature greater than about 100° C. to about 200° C. during the treatment process. Alternatively, the filler can be treated while it is being blended with the high consistency polydiorganosiloxane during preparation of the silicone rubber powder. In accordance with a preferred embodiment of the present method, the filler treating agent is sprayed into the mixing chamber during blending of the reinforcing filler with the polydiorganosiloxane, while the filler and polydiorganosiloxane are in the highly turbulent, fluidized state characteristic of the present method.

In highly preferred embodiments of the present invention, an alkoxysilane adhesion promoter (iii) is also incorporated in the silicone rubber powder composition. This alkoxysilane adhesion promoter contains at least one alkoxy group having 1 to 4 carbon atoms and at least one group selected from epoxy, acryloxy, methacryloxy, vinyl, phenyl or N-beta-(N-vinylbenzylamino)ethyl-gamma-aminoalkyl hydrochloride in its molecule. Preferred alkoxysilane adhesion promoters have the general formula

wherein Me hereinafter denotes a methyl radical and Q is selected from the group consisting of an epoxyalkyl group, an acryloxyalkyl group, a methacryloxyalkyl group, a vinyl group, a phenyl group and an N-beta-(N-vinylbenzylamino) ethyl-gamma-aminoalkyl monohydrogen chloride group.

Specific examples of such alkoxysilanes include gamma-acryloxypropyltrimethoxysilane, gamma-methacryloxypropyltrimethoxysilane, gamma-glycidoxypropyltrimethoxysilane, N-beta-(N-vinylbenzylamino)ethyl-gamma-aminopropyltrimethoxysilane monohydrogen chloride, phenyltrimethoxysilane and vinyltrimethoxysilane.

When the alkoxysilane adhesion promoter is employed, it is added at a level of about 0.5 to about 15 parts by weight for each 100 parts by weight of said silicone rubber powder, the addition being preferably carried out after the polydiorganosiloxane and treated silica filler have been mixed, as further described infra.

In addition to the above mentioned components, a number of additional ingredients can be added to the compositions of the present invention. These additional ingredients include but are not limited to extending fillers such as quartz, calcium carbonate, and diatomaceous earth; pigments such as iron oxide and titanium oxide, electrically conducting fillers such as carbon black and finely divided metals, heat stabilizers such as hydrated cerric oxide, flame retardants such as antimony compounds, hydrated aluminum oxide, magnesium compounds and halogenated hydrocarbons and resinous organosiloxane copolymers as reinforcing agents.

The silicone rubber powder (B) may be prepared in any mixing apparatus capable of maintaining the reinforcing filler in a fluidized state while blending the filler with the high consistency polydiorganosiloxane and applying sufficient shear to reduce the size of the resultant filler-coated polymer particles to a uniform powder having an average particle size of about 1 to about 1000 microns. Suitable mixers include, but are not limited to, Waring™ blenders having a high speed shearing blade at the bottom of a vertically oriented conical chamber and mixers manufactured by Rheinstahl Henschel AG, Kassel, Germany.

Mixer/granulators manufactured by Littleford Bros. Inc. Florence, Ky. are preferred mixing devices. These mixers are referred to as "plow" or "plowshare" mixers due to the presence of at least one plow or "T"-shaped blade located in a horizontally oriented cylindrical mixing chamber. The plow blade rotates on the horizontal axis of the chamber with the edge of the blade close to the perimeter of the chamber. In addition to maintaining the silica in a fluidized state and uniformly dispersing the polymer particles throughout the silica to achieve a homogeneous blend, the plow blade is also believed to agglomerate the ultimate particles produced by high speed shearing blade(s), also present in the chamber, to achieve the desired final particle size. The speed of the plow blade required to maintain the silica in a fluidized form is typically from 30 to about 200 revolutions per minute, and is dependent upon the capacity of the mixing chamber and the particle size range of the final powder. A speed of from 80 to 180 revolutions per minute is preferred using a 130 liter-capacity mixing chamber. The speed would be proportionally slower for a larger capacity mixer. The mixing chamber also contains at least one high speed chopping blade to provide the shearing force required to reduce the particle size of polydiorganosiloxane to a fine powder. A preferred embodiment of a mixing chamber contains at least one conical array of one to six blades rotating on a single shaft and ranging in diameter from 4 to 9 inches (10 to 23 cm), the smallest diameter blade being located closest to the mixer wall. It is believed that the speed of the chopping blade(s) should be between about 2000 to about 4000 revolutions per minute when it is desired to prepare silicone rubber powders of the present invention with a processing time of up to 30 minutes.

In accordance with the preferred method for preparing the silicone rubber powder (B), at least a portion of the reinforcing filler is maintained in a highly turbulent, fluidized state in the mixing apparatus by stirring or otherwise agitating the filler particles sufficiently to break apart agglomerates, entrap air or other gas between the filler particles and maintain the particles suspended in the mixing chamber. The suspended filler particles assume the characteristics of a fluidized bed with respect to the ability of the suspended filler particles to rapidly coat the particles of polydiorganosiloxane that are added to the mixing apparatus together with or shortly following addition of the filler. The additional ingredients described above can be added to the mixing chamber together with the filler or with the polydiorganosiloxane. However, if the alkoxysilane adhesion promoter (iii) is to be used, this ingredient should be added after the polydiorganosiloxane (i) and treated silica (ii) have already been mixed.

In accordance with a preferred method, the particles of treated silica filler are fluidized and heated to a temperature of greater than 100° C. before the polydiorganosiloxane is added.

To avoid or minimize the presence of gel particles and reduce processing time, the temperature within the mixing chamber is maintained at greater than 100° C. to about 200° C., preferably greater than about 100° C. to 150° C., during the entire process for preparing the silicone rubber powder (B), which typically requires from 2 to 120 minutes, depending upon the amount of silica.

In a preferred embodiment of the present method, to reduce the capacity of the mixing chamber required to prepare a given amount of the silicone rubber powder, only a portion of the filler is added initially, due to the large increase in filler volume during fluidization. This volume decreases substantially as the silica densifies and coats the polydiorganosiloxane in the mixing chamber. The remaining filler is initially placed in a hopper or other suitable dispensing container and allowed to drop into the chamber as the volume of silica initially present in the mixer decreases due to densification and coating of the polydiorganosiloxane particles. This method of filler addition utilizes the full volume of the mixing chamber throughout the process of preparing the finely divided organosiloxane composition.

The free-flowing silicone powder compositions prepared using the present method can be stored for extended periods of time at temperatures up to about 60° C. without undergoing any significant change in plasticity of the rubber.

A composition of the present invention may be prepared by thoroughly mixing from about 0.2 to about 50 parts by weight of the silicone rubber powder (B) with 100 parts by weight of the poly(phenylene ether) (A). This mixing can be accomplished at elevated temperatures by any of the conventional methods used to disperse various components in high viscosity resins. The temperature and other conditions of such a mixing operation is dependent upon the particular poly(phenylene ether) selected and may be determined by routine experimentation by those skilled in the art. For example, the preferred resin, poly(2,6-dimethyl-1,4-phenylene ether), may be mixed according to this method at a temperature from about 270° C. to about 320° C. Alternatively, the silicone rubber powder can be premixed with the poly(phenylene ether) resin, which mixture is then fed to an extruder. Examples of suitable equipment for this purpose include such machines as twin screw extruders and single screw extruders, inter alia.

As stated above, when the only concern is processability of the poly(phenylene ether) resin, from about 0.2 to about 3 parts by weight of silicone rubber powder may be used to modify each 100 parts by weight of the poly(phenylene ether). However, in order to obtain optimum impact resistance in the modified resin, from about 5 to about 20 parts by weight of the poly(phenylene ether). Thus, after components (B) and (A) are mixed to a homogeneous state, the resulting modified poly(phenylene ether) resin can be further processed by conventional techniques, such as extrusion, vacuum forming, injection molding, blow molding or compression molding, to fabricate plastic parts which have improved impact resistance over the unmodified resin. Such parts find utility in various industrial applications where a high performance engineering plastic is required. Examples include electrical and electronic insulation components, such as motor, coil and transformer insulation; housings for various electrical and electronic equipment, such as machines and hand tools; structural members; furniture; automotive components, such as engine and interior structural components; aircraft interior components; and freezer-to-oven cookware, inter alia.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C., unless indicated to the contrary.

Example 1

A silicone rubber powder of the present invention was prepared by first treating a silica filler and then blending the treated filler with a polydimethylsiloxane gum as follows.

The mixing chamber of a 130 liter capacity Littleford Mixer/Granulator (Model FM 130 D; Littleford Bros., Inc., Florence, Ky.) was heated and maintained at a temperature of 135° C. Nitrogen was passed through the mixer chamber at a flow rate of 120 cubic feet per hour (CFH). The nitrogen flow rate was then reduced to 10 CFH and about half of a 31.95 parts charge of a fume silica having a nominal surface area of 250 $m^2$/gram was added. The chopper and plow blades of the mixer were started (about 160 rpm for plow blade and about 3400 rpm for chopper blades) and 6.80 part of a hydroxy-terminated polydimethylsiloxane fluid having a viscosity of about 40 cS and an average degree of polymerization (DP) of about 8 was sprayed into the mixer chamber using an atomizer nozzle. After about one minute, 59.17 parts of a dimethylvinylsiloxy-terminated polydimethylsiloxane gum containing 0.142 mole percent of methylvinylsiloxane units and exhibiting a Williams plasticity number of about 150 was added to the mixer chamber. The remaining silica was then introduced in addition to 2.07 parts of an organosiloxane copolymer resin containing 7.2 mol percent of $CH_3SiO_{3/2}$ uits, 24 mol percent or $(CH_3)_2SiO$ units, 3.2 mol percent of $CH_3SiO_{1/2}$ units, 15.4 mol percent of $(CH_2=CH)(CH_3)SiO$ units and 50 mol percent of $PhSiO_{2/2}$ units, wherein Ph hereinafter denotes a phenyl radical.

The nitrogen purge rate was increased to 120 CFH and the contents were mixed for an additional 20 minutes, after which the mixer was cooled to below 50° C. and a silicone rubber powder having the appearance of a free-flowing fine sugar powder was isolated.

Example 2

The procedure of Example 1 was followed with the exception that 1.75 parts of an adhesion promoter, gamma-glycidoxypropyltrimethoxysilane, was added after the 20 minute mixing step. This additional ingredient was mixed at the elevated temperature for about 10 minutes before the above described cooling step was carried out. The resulting silicone rubber powder was a free-flowing "crumbly" powder.

Example 3

The procedure of Example 2 was followed with the exception that the silica treating agent used was a hydroxy-terminated polydimethylsiloxane fluid having an average degree of polymerization (DP) of about 4. The resulting silicone rubber powder was a free-flowing "crumbly" powder.

The above materials were blended with a poly(phenylene ether) resin using a Haake System 90 TW100 extruder (Haake/Fisons Instruments, Paramus, N.J.) to form compositions of the present invention, the relative amounts being shown in Table 1. The resin used, HPX-100L, was obtained from Mitsubishi Gas and Chemical, Tokyo, Japan and is described as a poly(2,6-dimethyl-1,4-phenylene ether).

The extruder conditions employed were:
Feed zone 1 temperature=280° C.;
Feed zone 2 temperature=310° C.;
Mixing zone 3 and exit zone 4 temperature=300° C.;
Screw speed=50 revolutions per minute (rpm);
Die=⅛ inch diameter strand die.

The extrudate from the above mixing operation was cooled, chopped into pellets, dried for 2.5 hours at 100° C. and fabricated into impact test bars measuring ½×5×⅛ inch using a Boy model 15S screw-type injection molding machine (Boy Machine Corp., Exton, Pa.). The molding parameters used were:

Mixing zone 1 and 2 temperatures=300° C.
Nozzle zone 3 dial setting=72.
Mold temperature=165° C.
Injection pressure=7,850 psi.
Screw discharge set point=2.0.
Mold clamp pressure=4,300 psi.
Screw speed=100 rpm.
Shot size dial=36.
Mold time=30 seconds.

The above described impact bars were notched and tested for impact strength according to ASTM D 256 (American Society for Testing Materials), the results also being presented in Table 1.

TABLE 1

| Silicone Rubber Powder Used | Percent in Resin | Parts per Hundred Parts of Resin | Izod Notched Impact Strength (ft-lbs/inch) |
|---|---|---|---|
| Example 1 | 1 | 1.01 | 1.5 |
| Example 1 | 5 | 5.26 | 2.4 |
| Example 1 | 10 | 11.11 | 2.6 |
| Example 1 | 15 | 17.65 | 3.9 |
| Example 2 | 15 | 17.65 | 5.2 |
| Example 3 | 15 | 17.65 | 8.6 |

For comparison purposes and according to the above procedures, the HPX-100L resin was modified with various amounts of STYRON™ 484-27-W high impact polystyrene (HIPS) obtained from the Dow Chemical Co., Midland, Mich., as shown in Table 2. It was observed that, contrary to the results reported in Table 1, the HPX-100L resin could not be extruded when the HIPS content was below about 20%.

TABLE 2

| Percent HIPS in poly (phenylene ether) Resin | Izod Notched Impact Strength (ft-lbs/inch) |
|---|---|
| 20 | 1.3 |
| 30 | 1.2 |
| 40 | 2.3 |
| 50 | 1.7 |

Again, for comparative purposes, the silicone rubber powder of Example 3 was used at a 15% level to modify a general purpose polystyrene resin (STYRON™ 685D; Dow Chemical Co.). This blend was prepared in similar equipment to the above described materials wherein the extruder zone 1 was 200° C., and zones 2 through 4 were 210° C. The blend was molded into bars which exhibited an Izod notched impact strength of about 0.3 ft-lbs/inch. Such a low value of impact resistance is comparable to the unmodified polystyrene (i.e., about 0.23 ft-lbs/inch) and is considerably below the values obtained with HIPS (i.e., about 1.9 to 2.7 ft-lbs/inch), therefore showing that the silicone rubber powders of the invention are not useful as an impact modifier for this type of resin.

A further series of comparative evaluations was performed wherein a phenol-terminated polyethersulfone (VICTREX™ PES 5003; ICI Americas Corp., Wilmington, Del.) was modified with various amounts of the silicone rubber powder of Example 3, as shown in Table 3. All zones of the mixing extruder in this series of experiments were set at a temperature of 360° C.

TABLE 3

| Percent of composition of Example 3 in PES 5003 resin | Observation |
|---|---|
| 0 (i.e., pure resin) | Could not process. |
| 1 | Extruded well. |
| 5 | Extruded fairly well. |
| 10 | Poor processing; occasional strand breaks*; some gassing. |
| 15 | Poor processing; many strand breaks*; much gassing. |

*Strand breaks indicate that the extrudate broke off, usually near the extruder die, before it could be cooled in a water bath.

In addition to poor extrusions obtained at the higher loadings of the silicone rubber powder in the PES 5003 resin, it was observed that the modified resins containing the lower amounts of the silicone rubber could not be molded satisfactorily in a screw-type injection molding machine due to copious gas evolution. For this reason, impact test bars were not produced and it was concluded that the silicon rubber powder of the invention is not a suitable modifier for the polyethersulfone resin.

A further comparison was carried out in which the unfilled polydiorganosiloxane gum used in Examples 1–3 was injected into the first heating zone of the Haake extruder, under the conditions described for processing the poly (phenylene ether) resins of these examples. This gum was added at a modification level of 15% in the HPX-100L resin and molded into test bars as before, which bars showed an Izod impact strength of 1.66 ft-lb/inch. Additionally, this 15% blend was employed as a concentrate which was then diluted with additional poly(phenylene ether) resin in the extruder to form a modified system having a 1% gum content. This blend was also molded into test bars and found to have an impact strength of 0.97 ft-lb/in. It is thus seen that the use of unfilled silicone gum does not provide the benefits of the instant compositions.

A series of experiments was conducted wherein a composition of the invention consisting of 1 part of the silicone rubber powder of Example 3 was mixed with 99 parts of the HPX-100L resin in the Haake extruder at a screw speed of 50 rpm and under the conditions shown in Table 4.

TABLE 4

| Extruder Temperature (°C.) | | | Screw Torque |
|---|---|---|---|
| Zone 2 | Zone 3 | Zone 4 | (meter-grams) |
| 310 | 300 | 300 | 5300 |
| 300 | 290 | 290 | 3500 |
| 290 | 280 | 280 | 8500 |
| 280 | 270 | 270 | 11000 |
| 270 | 260 | 260 | 17000* |

*Maximum extruder capability; no product was recovered.

It was observed that the use of a small amount of the silicone rubber powder of the invention to modify the PPE resin allows processing at a temperature much below that required to induce flow in the virgin resin, the latter condition leading to significant polymer degradation. It was also noted from Table 4 that the extrusion temperature could be reduced about 20 to 30° C. below the values recommended for processing a typical PPE/HIPS resin, NORYL™ 731 (i.e., the highest temperature conditions reported in Table 4). NORYL™ 731 is a product of the General Electric Co., Pittsfield, Mass., and is believed to be a blend of about 30 to 40 parts of HIPS in 70 to 60 parts of poly(2,6-dimethyl-1,4-phenylene ether) resin.

As a clear demonstration of an additional benefit to be derived from the use of the compositions of the present invention, the modified resins shown in Table 5 were tested with respect to softening point. A thermal mechanical analyzer was employed wherein a 2.5 mm diameter probe, loaded with a 2 gram weight, was placed atop a resin sample. Each sample was heated at a rate of 10° C./minute and its softening point noted as the probe started to penetrate the sample surface. From this table, it can be seen that the compositions of the present invention do not lower the softening point of the virgin resin to a great extend (the glass transition temperature of poly(2,6-dimethyl-1,4-phenylene ether) resin is about 205° C.). To the contrary, the poly (phenylene ether)/HIPS blend resulted in a softening point depression of about 60° C.

TABLE 5

| Modified Resin System | Softening Point (°C.) |
| --- | --- |
| 1 part Example 3/99 parts HPX-100L | 201 |
| 15 parts Example 3/85 parts HPX-100L | 195 |
| NORYL ™ 731 Resin | 135 |

We claim:

1. A composition comprising a homogeneous blend of:
   (A) 100 parts by weight of a poly(phenylene ether) thermoplastic polymer;
   (B) from 0.2 to 50 parts by weight of a silicone rubber powder uniformly dispersed in said poly(phenylene ether) thermoplastic polymer, said silicone rubber powder consisting essentially of
      (i) 100 parts by weight of a polydiorganosiloxane gum which contains at least one functional group selected from the group consisting of hydroxyl and vinyl, and
      (ii) from 10 to 80 parts by weight of a silica filler; and
   (C) from 0.5 to 15 parts by weight of an alkoxysilane adhesion promoter for each 100 parts by weight of said silicone rubber powder (B), wherein said adhesion promoter contains at least one alkoxy group having 1 to 4 carbon atoms and at least one group selected from epoxy, acryloxy, methacryloxy, vinyl, phenyl, or N-beta-(N-vinylbenzylamino)ethyl-gamma-aminoalkyl hydrochloride.

2. The composition according to claim 1, wherein said poly(phenylene ether) (A) is poly(2,6-dimethyl-1,4-phenylene ether).

3. The composition according to claim 2, wherein said polydiorganosiloxane is a polydimethylsiloxane.

4. The composition according to claim 3, wherein said filler is a silica filler having a surface area of 50 to 400 square meters per gram which has been treated with a hydroxy-terminated polydimethylsiloxane having a degree of polymerization of 2 to 100.

5. The composition according to claim 4, wherein said adhesion promoter has the formula $$QSi(OMe)_3$$

wherein Me denotes a methyl radical and Q is selected from the group consisting of epoxyalkyl group, an acryloxyalkyl group, a methacryloxyalkyl group, a vinyl group, a phenyl group and an N-beta-(N-vinylbenzylamino)ethyl-gamma-aminoalkyl monohydrogen chloride group.

6. The composition according to claim 5, wherein said adhesion promoter is selected from the group consisting of gamma-acryloxypropyltrimethoxysilane,
gamma-methacryloxypropyltrimethoxysilane,
gamma-glycidoxypropyltrimethoxysilane,
N-beta-(N-vinylbenzylamino)ethyl-gamma-aminopropyltrimethoxysilane monohydrogen chloride,
phenyltrimethoxysilane and vinyltrimethoxysilane.

7. The composition according to claim 4, wherein said hydroxy-terminated polydiorganosiloxane has an average degree of polymerization of 2 to 10.

8. A composition consisting essentially of a homogeneous blend of
   (A) 100 parts by weight of a poly(phenylene ether) thermoplastic polymer; and
   (B) from 0.2 to 50 parts by weight of a silicone rubber powder uniformly dispersed in said poly(phenylene ether) thermoplastic polymer, said silicone rubber powder being prepared by mixing
      (i) 100 parts by weight of a polydiorganosiloxane gum which contains at least one functional group selected from the group consisting of hydroxyl and vinyl, and
      (ii) from 10 to 80 parts by weight of a silica filler, said mixing being carried out in a temperature range of greater than 100° C. to 200° C. and under sufficient shear to impart an average particle size of 1 to 1000 microns to said silicone rubber powder.

9. The composition according to claim 1, wherein 0.2 to 3 parts by weight of said silicone rubber powder (B) is combined with 100 parts by weight of said poly(phenylene ether) (A).

10. The composition according to claim 1, wherein 5 to 20 parts by weight of said silicone rubber powder (B) is combined with 100 parts by weight of said poly(phenylene ether) (A).

11. The composition according to claim 2, wherein 5 to 20 parts by weight of said silicone rubber powder (B) is combined with 100 parts by weight of said poly(phenylene ether) (A).

12. The composition according to claim 3, wherein 5 to 20 parts by weight of said silicone rubber powder (B) is combined with 100 parts by weight of said poly(phenylene ether) (A).

13. The composition according to claim 4, wherein 5 to 20 parts by weight of said silicone rubber powder (B) is combined with 100 parts by weight of said poly(phenylene ether) (A).

14. The composition according to claim 5, wherein 5 to 20 parts by weight of said silicone rubber powder (B) is combined with 100 parts by weight of said poly(phenylene ether) (A).

15. The composition according to claim 6, wherein 5 to 20 parts by weight of said silicone rubber powder (B) is combined with 100 parts by weight of said poly(phenylene ether) (A).

16. The composition according to claim 7, wherein 5 to 20 parts by weight of said silicone rubber powder (B) is combined with 100 parts by weight of said poly(phenylene ether) (A).

17. The composition according to claim 8, wherein 5 to 20 parts by weight of said silicone rubber powder (B) is combined with 100 parts by weight of said poly(phenylene ether) (A).

* * * * *